United States Patent
Banavar et al.

(10) Patent No.: US 7,050,432 B1
(45) Date of Patent: May 23, 2006

(54) MESSAGE LOGGING FOR RELIABLE MULTICASTING ACROSS A ROUTING NETWORK

(75) Inventors: Guruduth Somasekhara Banavar, Yorktown Heights, NY (US); Tushar Deepak Chandra, New York, NY (US); Kevan Lee Miller, Danbury, CT (US); Robert Evan Strom, Ridgefield, CT (US); Daniel Charles Sturman, Englewood, NJ (US); Michael James Ward, New Haven, CT (US)

(73) Assignee: International Busines Machines Corporation, Armonk, NY (US)

( * ) Notice: Subject to any disclaimer, the term of this patent is extended or adjusted under 35 U.S.C. 154(b) by 0 days.

(21) Appl. No.: 09/281,421

(22) Filed: Mar. 30, 1999

(51) Int. Cl.
*H04L 12/28* (2006.01)
*H04L 12/56* (2006.01)
(52) U.S. Cl. ............ 370/390; 370/428; 370/237; 714/748; 714/749
(58) Field of Classification Search ........... 370/216, 370/218, 219, 220, 227, 228, 237, 394, 390, 370/428, 408, 410, 477, 400; 707/10; 709/241; 714/748, 749
See application file for complete search history.

(56) References Cited

U.S. PATENT DOCUMENTS

| | | | |
|---|---|---|---|
| 5,222,061 A * | 6/1993 | Doshi et al. ............ | 370/394 |
| 5,257,369 A | 10/1993 | Skeen et al. ............ | 395/650 |
| 5,325,362 A | 6/1994 | Aziz ...................... | 370/94.3 |
| 5,517,562 A | 5/1996 | McConnell ............. | 379/207 |
| 5,522,046 A | 5/1996 | McMillen et al. ...... | 395/200.15 |
| 5,555,244 A | 9/1996 | Gupta et al. ............ | 370/60.1 |
| 5,557,798 A | 9/1996 | Skeen et al. ............ | 395/650 |
| 5,570,366 A | 10/1996 | Baker et al. ............ | 370/85.13 |
| 5,581,764 A | 12/1996 | Fitzgerald et al. ..... | 395/703 |
| 5,604,867 A | 2/1997 | Harwood ............... | 395/200.13 |

(Continued)

OTHER PUBLICATIONS

Ryan Huebsch & Boon Thau Loo (Content-Based Multicast: Comparison of Overlay Network Implementations).*

(Continued)

*Primary Examiner*—Wellington Chin
*Assistant Examiner*—Chuong Ho
(74) *Attorney, Agent, or Firm*—Douglas W. Cameron, Esq.; Kevin P. Radigan, Esq.; Heslin Rothenberg Farley & Mesiti, P.C.

(57) ABSTRACT

A technique for reliably multicasting a message within a router network is provided. At least one special router in the network has associated persistent storage for logging a message being routed to one or more clients. When a message is received at this logger node, the logger places the message in persistent storage and sends a logging acknowledgment back to those routers to which the message was originally routed, as well as back towards the source of the message. The logger acknowledgment includes the message id, the logger id, and a logging number. When the logger acknowledgment is received by a router, it looks up the routing information from the original message, and sends the acknowledgment to those neighboring routers to which the original message was sent, excluding the link from which the logger acknowledgment was received. If the original message corresponding to the logger acknowledgment was buffered at this router waiting to be delivered, the message is then delivered to its client nodes. Processes for recovering from node or link failure within the router network, and for at most once delivery of messages, at least once delivery of messages, and exactly once delivery of messages are also provided.

27 Claims, 10 Drawing Sheets

U.S. PATENT DOCUMENTS

| | | | | |
|---|---|---|---|---|
| 5,974,417 | A | * | 10/1999 | Bracho et al. ................ 707/10 |
| 6,021,443 | A | * | 2/2000 | Bracho et al. .............. 709/241 |
| 6,091,724 | A | * | 7/2000 | Chandra et al. ............ 370/390 |
| 6,101,180 | A | * | 8/2000 | Donahue et al. ............ 370/389 |
| 6,101,192 | A | * | 8/2000 | Wakeland .................. 370/429 |
| 6,115,753 | A | * | 9/2000 | Joens ........................ 709/242 |
| 6,119,163 | A | * | 9/2000 | Monteiro et al. ........... 709/227 |
| 6,134,599 | A | * | 10/2000 | Chiu et al. .................. 709/249 |
| 6,272,107 | B1 | * | 8/2001 | Rochberger et al. ........ 370/216 |
| 6,336,119 | B1 | * | 1/2002 | Banavar et al. .......... 707/104.1 |
| 6,343,067 | B1 | * | 1/2002 | Drottar et al. .............. 370/218 |
| 6,389,475 | B1 | * | 5/2002 | Speakman et al. .......... 709/232 |

OTHER PUBLICATIONS

Hanson et al., "A Predicate Matching Algorithm for Database Rule Systems", Published at Proceedings of SIGMOD, pp. 271-280 (1991).

Mishra et al., "Consul: A Communication Substrate for Fault-Tolerant Distributed Programs", TR91-32, Department of Computer Science, The University of Arizona, pp 1-33 (Nov. 1991).

Smirnov, M.I., "Object-Oriented Framework for a Scalable Multicast Call Modelling", Teleservices and Multimedia Communications Second International COST 237 Workshop, Proceedings, Springer-Verlag, vii+277, pp. 1-39 (1996).

Hofmann, M., "A Generic Concept for Large-Scale Multicast", Broadband Communications, Network, Services, Applications, Future Directions, International Zurich Seminar on Digital Communications, IZS '96, Proceedings, Springer-Verlang, xiv+358, pp. 95-106 (1996).

Zabele et al., "High Performance Infrastructure For Visually-Intensive CSCW Applications", Transcending Boundaries, CSCW '94, Proceedings of the Conference on Computer Supported Cooperative Work, ACM, xi+464, pp. 395-403 (Oct. 1994) (Abstract Only).

K.P. Birman, "The Process Group Approach to Reliable Distributed Computing", Communications of the ACM, vol. 36, No. 12 (Dec. 1993), pp. 37-53.

Oki et al., "The Information Bus—An Architecture for Extensible Distributed Systems", SIGOPS '93, ACM 0-89791-632-8/93/0012, (1993), pp. 58-68.

D. Powell, "Group Communication", Communications of the ACM, vol. 39, No. 4; (Apr. 1996), pp. 52-100.

M.I. Smirnov, "Efficient Multicast Routing in High Speed Networks", IN Comput Commun. (UK), vol. 19, No. 1, Elsevier, (Jan. 1996), pp. 59-75, 45 Ref. (Abstract Only).

M. Grossglauser, "Optimal Deterministic Timeouts for Reliable Scalable Multicast", 0743-166X/96, 1996 IEEE, pp. 1425-1432.

* cited by examiner

MESSAGE LOGGING FOR RELIABLE MULTICASTING ACROSS A ROUTING NETWORK

CROSS-REFERENCE TO RELATED APPLICATIONS

This application contains subject matter which is related to the subject matter of the following United States patent applications, which are assigned to the same assignee of this application. Each of the below-listed applications is hereby incorporated herein by reference:

"Routing Messages Within A Network Using The Data Content Of The Message," by Chandra et al., filed Nov. 20, 1997, Ser. No. 08/975,303;

"Message Sequencing For Ordered Multicasting Of A Message Across A Routing Network," by Banavar et al., co-filed herewith, Ser. No. 09/280,530;

"Quiescent Reconfiguration Of A Routing Network," by Miller et al., co-filed herewith, Ser. No. 09/282,101; and "Non-Disruptive Reconfiguration Of A Publish/Subscribe System," by Miller et al., co-filed herewith, Ser. No. 09/280,534.

TECHNICAL FIELD

This invention relates in general to multicasting messages within a network and, in particular, to logging messages to persistent storage within a routing network to facilitate reliable delivery thereof to one or more clients. Further, the invention relates to reliably multicasting a message within a content-based routing network irrespective of destination information that may be included within the message.

BACKGROUND OF THE INVENTION

Many network environments enable messages to be forwarded from one site within the network to one or more other sites using a multicast protocol. Typical multicast protocols send messages from one site to one or more other sites based on information stored within a message header. That is, each message has two components: the message header, which includes the routing information, including destination addresses or a predefined group name that is associated with a fixed list of destinations, and a data content, which is the data of the message. The routing information is read from the message header and is used to send the data content of the message to the specified destinations.

One example of a system that conventionally includes such a network environment is a publish/subscribe system. In publish/subscribe systems, publishers post messages and subscribers independently specify categories of events in which they are interested. The system takes the posted messages and includes in each message header the destination information of those subscribers indicating interest in the particular message. The system then uses the destination information in the message to forward the message through the network to the appropriate subscribers.

In large systems, there may be many subscribers interested in a particular message. Thus, a large list of destinations needs to be added to the message header and used in forwarding the message. The use of the list, which can be even longer than the message itself, can degrade system performance. Other approaches have included the use of multicast groups, in which destinations are bound to a group name, and then that name is included in the message header. The message is then sent to all those destinations bound to the name. This technique has the disadvantage of requiring static groups of destinations, which restricts flexibility in many publish/subscribe systems.

DISCLOSURE OF THE INVENTION

A publish/subscribe system consists of a network of message routers (or simply routers) connected via links in an arbitrary graph topology. A number of clients connect to the periphery of this router network and either publish or subscribe to messages. A message consists of a number of attributes, which are name-value pairs. A subscription specifies a predicate on the attributes of messages.

The router network is responsible for routing messages from publishers to interested subscribers based on matching events to subscription predicates. One embodiment of this routing protocol, referred to as content-based routing, is described in the above-incorporated co-pending patent application entitled "Routing Messages Within A Network Using The Data Content Of The Message." Content-based routing proceeds as follows. From each router node at which a publisher is present, the system computes and stores a spanning tree to reach every other node in the network. All published messages from a particular publisher then follow the paths in the corresponding spanning tree, with each router node performing enough matching to determine which of its child routers should receive the published message. All paths preserve a first-in first-out (FIFO) ordering on messages from any one publisher to all subscribers.

Briefly summarized, the present invention is directed in one aspect to providing a mechanism for multicasting messages in a manner which is resilient to failures in the network, routers, or clients (e.g., publishers/subscribers). Resiliency is achieved by logging messages to persistent storage within the network prior to delivery thereof to one or more clients.

More particularly, provided herein is a method for routing messages within a network. The method includes: receiving a message; and routing the message to one or more clients of the network, the routing being based on data content of the message irrespective of any destination information that may be within the message, and being resilient to router or link failure within the network.

In another aspect, the invention comprises a method for routing messages within a network which includes: receiving a message; logging the message to persistent storage within the network; and routing the message to one or more clients of the network after logging the message to persistent storage, wherein the logging is used to ensure resiliency in routing the message to one or more clients of the network notwithstanding failure at a router or link within the network.

In yet another aspect, a system of routing messages within a network is provided. The system includes means for receiving a message, and means for routing the message to one or more clients of the network. The routing is based on data content of the message irrespective of any destination information that may be within the message, and the means for routing is resilient to router or link failure within the network.

In still another aspect, a system of routing messages within a routing network is provided which includes means for receiving a message, means for logging the message to persistent storage within the routing network, and means for delivering the message to one or more clients of the network after logging thereof to the persistent storage. By logging the message to persistent storage prior to delivery thereof, a technique is provided which ensures resiliency to the routing of the message to the one or more clients notwithstanding router or link failure within the network.

In a further aspect, an article of manufacture is provided which includes at least one computer usable medium having computer readable program code means embodied therein for effecting routing of messages within the network. The computer readable program code means in the article of manufacture includes: computer readable program code means for causing a computer to effect receiving a message; and computer readable program code means for causing a computer to effect routing the message to one or more clients of the network, the routing being based on data content of the message irrespective of any destination information that may be within the message, and being resilient to router or link failure within the network.

In a still further aspect, an article of manufacture is provided which includes at least one computer usable medium having computer readable program code means embodied therein for effecting routing of messages within a routing network. The computer readable program code means in the article of manufacture includes: computer readable program code means for causing a computer to effect receiving a message; computer readable program code means for causing a computer to effect logging the message to persistent storage within the routing network; and computer readable program code means for causing a computer to effect delivering the message to one or more clients of the network after the logging thereof, wherein the logging to persistent storage prior to delivery of the message provides resiliency to the routing network notwithstanding router or link failure within the network.

To restate, provided herein is a technique for logging messages within a routing network itself to ensure reliable multicasting across the network. Although principally described herein in connection with data-content routing of messages, the logging technique can be applied to other routing systems, e.g., subject-based routing. The technique is scalable through the provision of multiple loggers within the network. Additionally, multiple loggers can be used to balance the load on the system. A system implementing the logging technique of the present invention allows senders and receivers to connect anywhere in the network regardless of the location of the loggers. Messages are preferably logged only once within a router network. Again, logging of messages occurs within the network itself between the sender and the one or more clients to which the message is directed.

The logging technique described herein allows a sender or receiver to choose the level of reliability (i.e., quality of service) required by either the sender or the clients. This choice allows a tradeoff of system resources versus quality of service. For a sender or receiver requesting "uniform delivery", the routing network either delivers the message to all clients or delivers the message to none of the clients. For a sender or receiver requesting "at most once delivery", the routing network detects and eliminates duplicate messages. "At least once delivery" quality of service is also provided by ensuring that loss of a message within the routing network is identified, and the sender is notified to retransmit the message. For a sender or receiver requesting "exactly once delivery" the routing network neither loses the message without notifying the sender nor makes a duplicate delivery of the message to a client. Again, the particular type of delivery can be selected by the sender or the receiving client.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As noted above, the present invention is in one aspect an extension of the routing capability disclosed in the above-incorporated application wherein messages are routed in a network based on the content of the data within the message. In particular, the message does not need to include destination information, such as destination addresses or a group destination name. Instead, data within the message is used to traverse a data structure to determine the link or links over which the message is to be forwarded in order to reach the consumers (subscribers or clients) interested in the message.

In accordance with the principles of the present invention, this content-based routing capability is enhanced for multi-casting messages in a manner which is resilient to failures in the network, its routers, or clients. The invention is referred to herein as comprising a "reliable routing capability" for a routing network such as the above-described content-based routing network. However, those skilled in the art will recognize that the logging technique presented hereinbelow for ensuring message delivery notwithstanding a failure within the network is equally applicable to other routing systems, such as a subject-based routing system. This reliable routing capability includes support for four "qualities of service": (1) "uniform delivery" under which the routing network either delivers the message to all receivers or none of the receivers, (2) "at most once delivery" under which the routing network detects and eliminates duplicate messages, (3) "at least once delivery" under which the routing network detects the loss of a message and notifies the sender to retransmit the message, and (4) "exactly once delivery" under which the routing network neither loses a message without notifying the sender nor makes duplicate deliveries to receivers.

Figure 1:
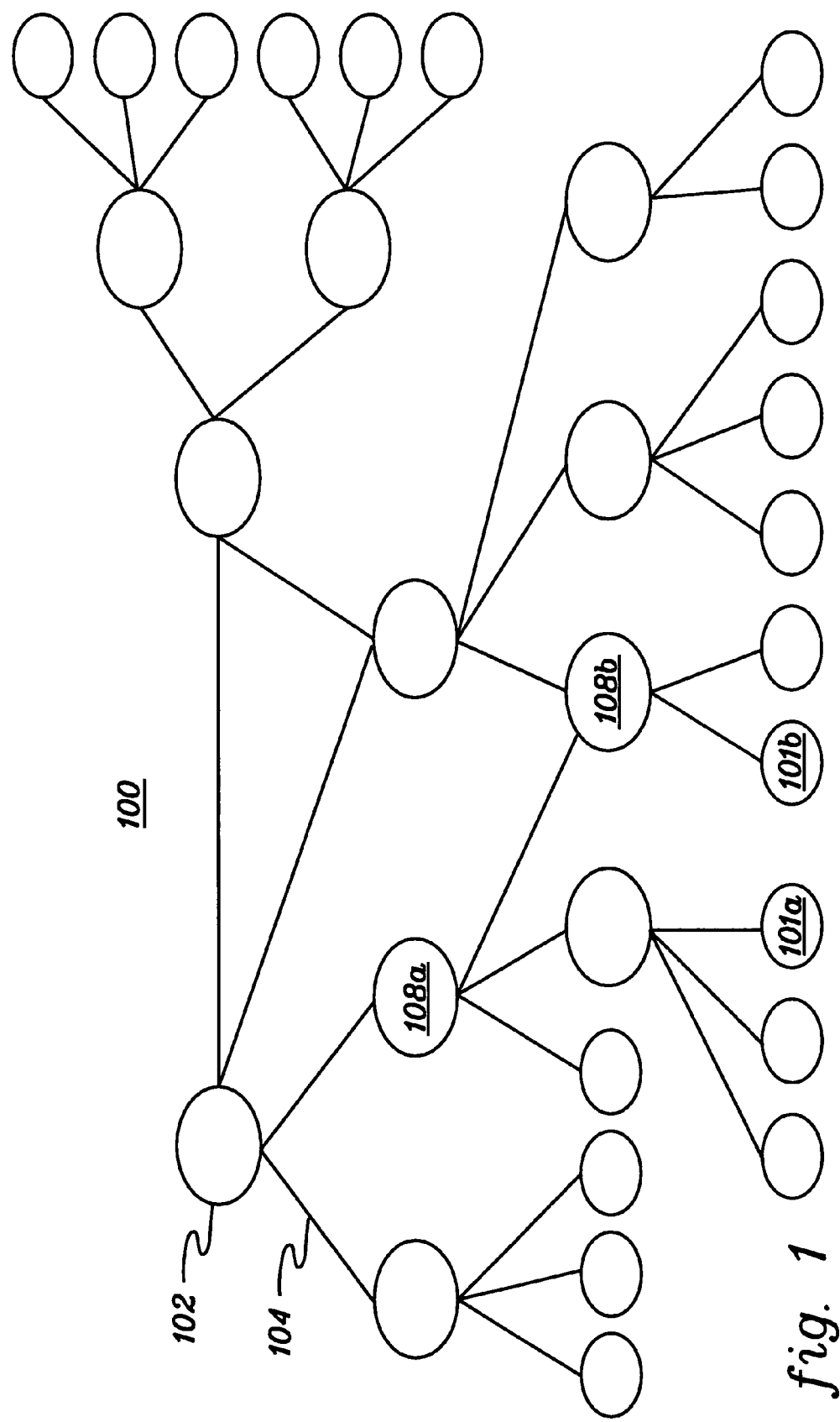
FIG. 1 depicts one example of a distributed network incorporating and using the resilient routing capability of the present invention.

One example of a distributed network 100 incorporating and using the reliable routing capability of the present invention is depicted in FIG. 1 and described in detail below. Network 100 includes, for instance, a plurality of computing units 102 coupled to one another by links 104.

Each link couples two computing units in the network, and each computing unit may have any number of links connected to it. Each link is bidirectional, i.e., a computing unit may send and receive messages on the link. Each link is also connection oriented, i.e., the computer units at the ends of the link are notified when the link fails. Furthermore, each link propagates messages in a first-in first-out manner. Each computing unit in the network is either a client computer (represented by the smaller ovals, such as those having addresses 101a, 101b), meaning that it has requested to receive messages whose content satisfies certain properties; or it is a router computer (represented by the larger ovals, such as 108a, 108b), meaning that it forwards messages received on one network link onto other links on the way to the client computer(s). The clients are collectively referred to herein as clients 101 and the routers are collectively referred to as routers 108. (For purposes of this discussion, if a single computing unit serves both as a router and as a client, these two separate functions will be considered as two computing units connected by a link.) Each computing unit can be any type of computing unit that can be included in a network. For example, it can be an RS/6000 computing node or any other of various types of computing nodes, processors, computers or systems. The network can also include different types of computing units coupled to one another via the links. The links include, for instance, TCP connections over IP links, as only one example.

Distributed network 100 can be included in various systems that require the passing of messages or data. These systems include, for instance, the internet or a content-based publish/subscribe system.

Content-based publish/subscribe systems improve the degree of decoupling between publishers and subscribers. In content-based publish/subscribe systems, subscriptions are specified in terms of predicates on the posted data, rather than in terms of subject identifiers supplied by the publisher. One example of a content-based publish/subscribe system is described in co-pending U.S. patent application Ser. No. 08/975,280, entitled "Method And System For Matching Consumers To Events," Astley et al., which is hereby incorporated herein by reference in its entirety. The examples described herein are with reference to a content-based subscription system. However, these are only examples. The present invention can be employed with other types of systems without departing from the spirit of the present invention.

In one embodiment of the invention, each router 108 of network 100 (FIG. 1) has associated therewith a spanning tree, which lays out the best path (according to some criterion, such as latency) from the router to each client 101.

In this embodiment, it is assumed that routers agree on a common criterion for measuring distance between nodes in the network. There may in fact be multiple spanning trees. For example, alternative spanning trees may specify either backup routes, or peak load routes. Herein, it is assumed that one spanning tree is in effect for the routing of any particular message.

Figure 2:
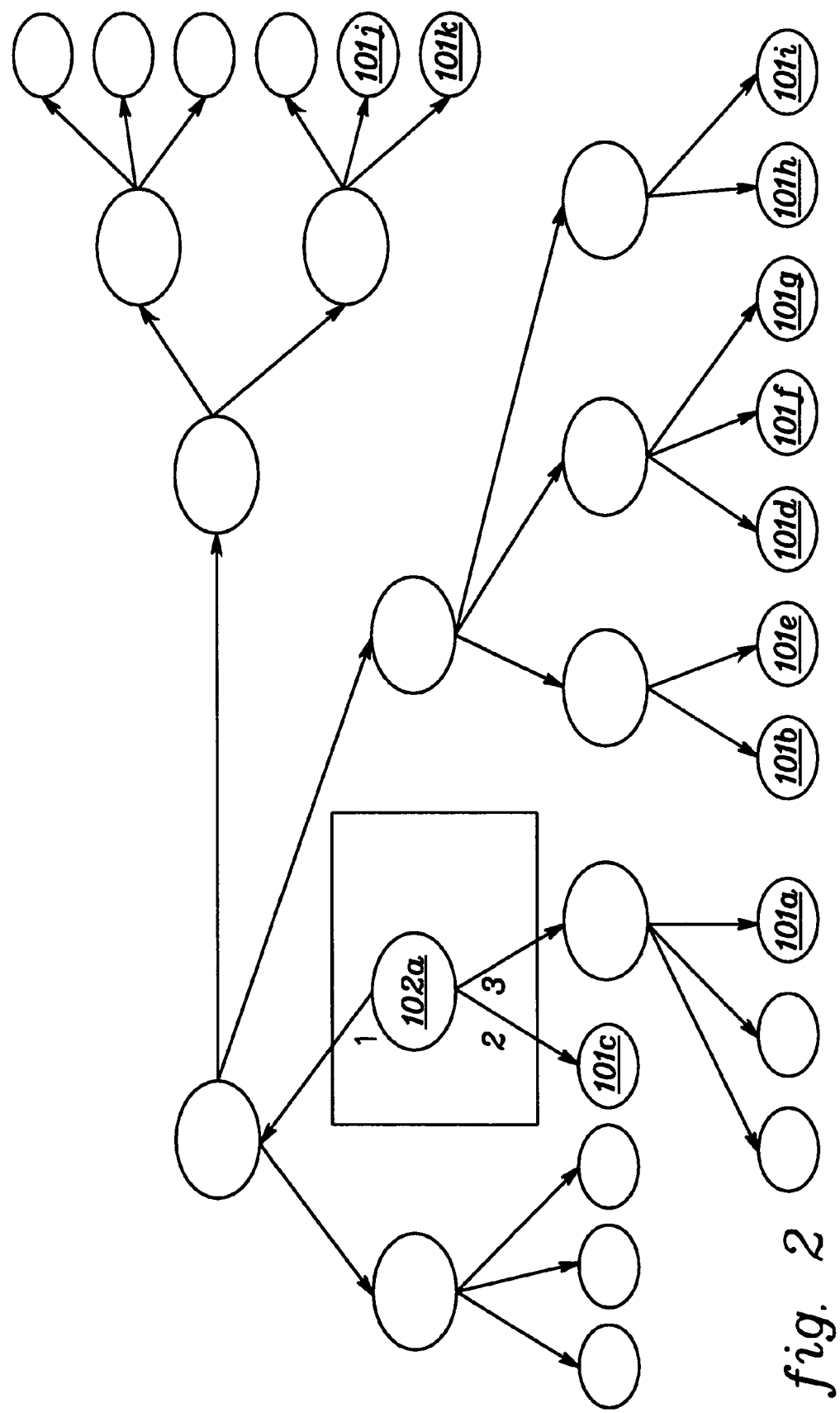
FIG. 2 depicts one example of a spanning tree used in accordance with the principles of the present invention.

One example of a spanning tree, which is associated with router 108a (FIG. 1), is depicted in FIG. 2. As shown in FIG. 2, there is a path from router 102a to every other node in the spanning tree. A message to be routed from router 102a to one or more of the other nodes is routed via one or more of the links associated with router 102a, i.e., links 1–3. For example, if a message is to be routed from node 102a to node 101c, then link 2 is used. As a further example, if a message is to be forwarded toward client 101a, then link 3 is used.

One embodiment for building a spanning tree from a network topology, that is an arbitrary graph, is described in detail in *Introduction to Algorithms*, by Cormen, Leiserson, Rivert, Chapter 24, pp 498–513, Published by MIT Press (1990), which is hereby incorporated herein by reference in its entirety.

In addition to the spanning tree associated with each router, each router has a routing table. The routing table includes an entry for each client computer in the network. Each entry of the routing table associates a client address with the identifier of the network link constituting the next segment on the path in the spanning tree from the router to the client. For a router with d network links, each such link identifier is an integer between 1 and d. For instance, the client having address 101a has a corresponding link identifier of 3 (see FIG. 2).

Each routing table is constructed via information from the network topology (e.g., the client addresses) and hence from the corresponding spanning tree (e.g., the link identifiers), in a known manner.

Figure 3:
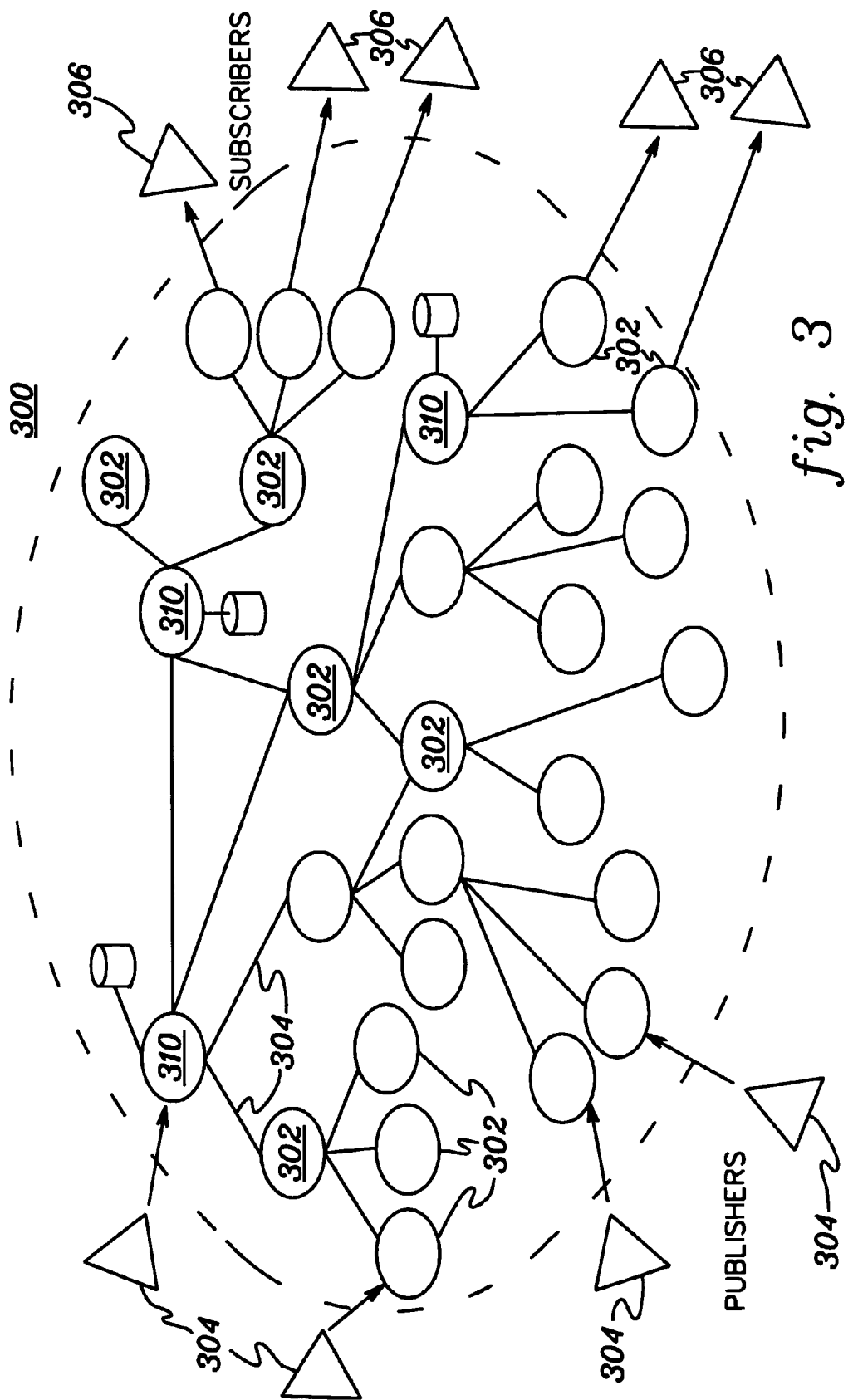
FIG. 3 depicts one embodiment of a distributed router network configured with the resilient routing capability of the present invention.

By way of example, FIG. 3 depicts one embodiment of a publish/subscribe system, generally denoted 300, to employ resilient message routing in accordance with the principles of the present invention. System 300 includes a network of routers 302 connected via links 303 in an arbitrary graph topology. A number of clients connected to the periphery of this router network either publish messages or subscribe to messages. Those clients publishing messages comprise publishers 304, while those clients subscribing to messages comprise subscribers 306. The router network is responsible for routing messages from a publisher 304 to interested subscribers 306 based on matching messages to subscription predicates.

This protocol, known as content-based routing, is described in detail in the initially-incorporated co-pending patent application entitled "Routing Messages Within A Network Using The Data Content Of The Message." Briefly explained, from each router node at which a publisher is present, the system computes and stores a spanning tree to reach every other node in the network. All published messages from the publisher follow the paths in that spanning tree, with each router node performing enough matching to determine which of its child routers should receive the message.

The present invention achieves reliability of routed messages by saving messages to persistent storage within the router network and retrieving and redelivering the message whenever there is a failure in the network. Publishers and subscribers that need reliability of messages may specify a quality of service parameter, e.g., "uniform delivery". Uniform delivery is provided for ensuring delivery of a message to all active subscribers notwithstanding failure in the network, e.g., the routers, or the links. Special routers in the router network 300 are designated logging nodes or loggers 310 and support the ability to log messages to stable storage. When there is at least one subscriber needing logging, the routing algorithm ensures that messages are routed to a logger. When reliable delivery is required by at least one publisher or subscriber, the routing protocol incorporates message logging in accordance with the principles of the present invention.

Briefly explained, messages originally sent by a publisher are assigned unique ids by the first router node receiving the message. All routers (including logging nodes) receiving a published message thereafter note the message's unique message id and the source node (i.e., publisher). Routing information comprising the nodes to which the message will be routed is then computed based on message content and stored, e.g., indexed by using the message id. Routing computation always includes the nearest logging node. Messages are then forwarded to applicable neighboring routers and delivered to any subscribing clients to that node not requiring reliable delivery. Messages to the node's subscribing clients requiring reliable delivery are not delivered, but instead buffered in a client message buffer (see FIG. 6a) for later delivery as explained further below.

Figure 4:
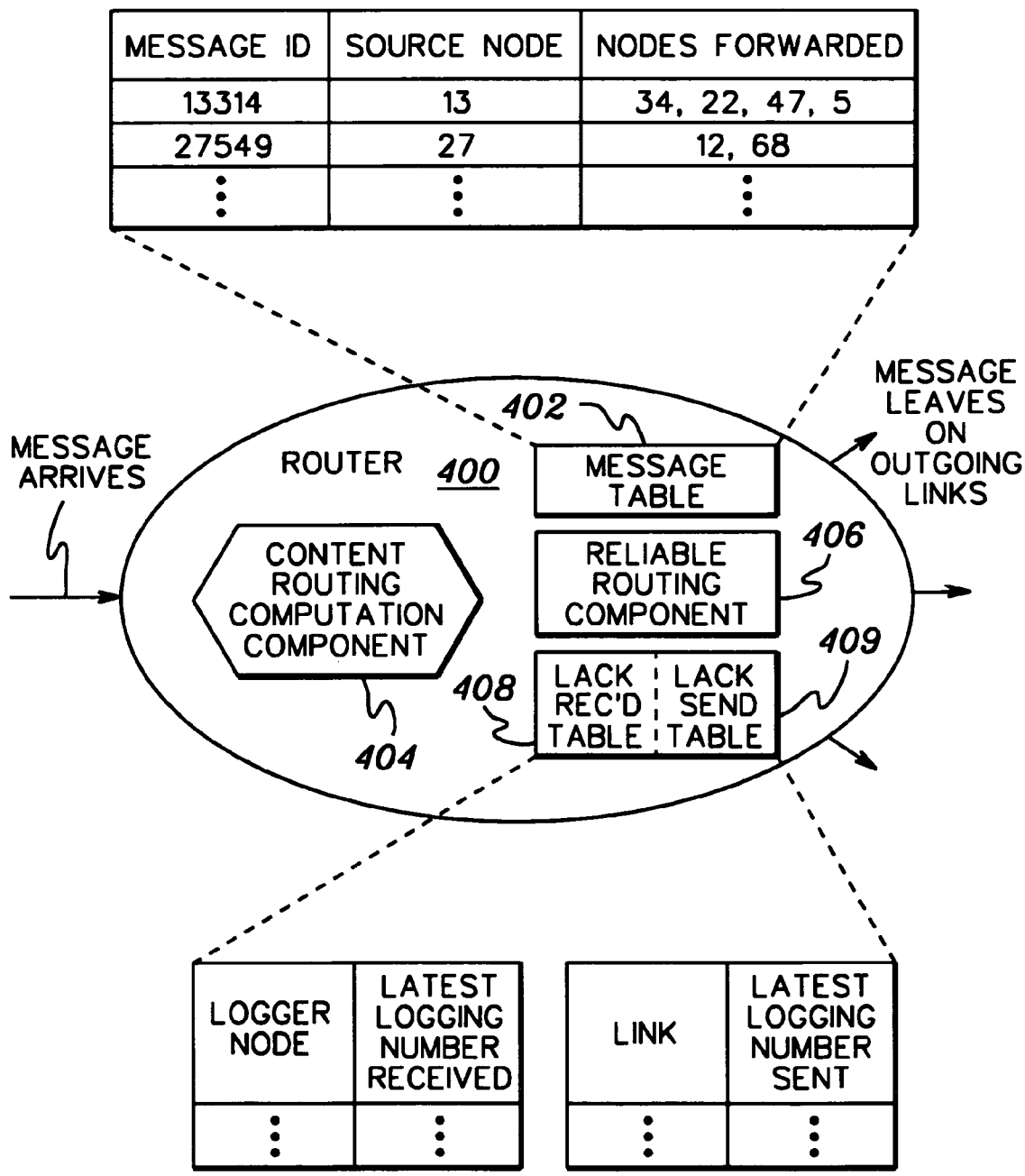
FIG. 4 depicts one embodiment of a router for use in accordance with the principles of the present invention in a router network such as depicted in FIG. 3.

FIG. 4 depicts one embodiment of a router node for use in accordance with the principles of the present invention. When a message arrives at router 400 it is stored into a message table 402 using the unique message identifier. Information stored includes the source node identification as well as the neighboring nodes to which the message is to be forwarded. These neighboring nodes are calculated by a content routing computation component 404 after the message has been received. Computation component 404 takes the message and based upon stored subscriptions returns a set of destinations or links upon which the message should be forwarded. Again, in one embodiment, this computation is content dependent and can be accomplished as described in the above-incorporated co-pending application. However, this component can be implemented in other ways, e.g., subject-based routing. In accordance with the principles of the present invention, router 400 also includes a reliable routing component 406 and logging acknowledge (LACK) received table 408 and LACK send table 409, which are described further below.

Figures 5, 6A, 6B:
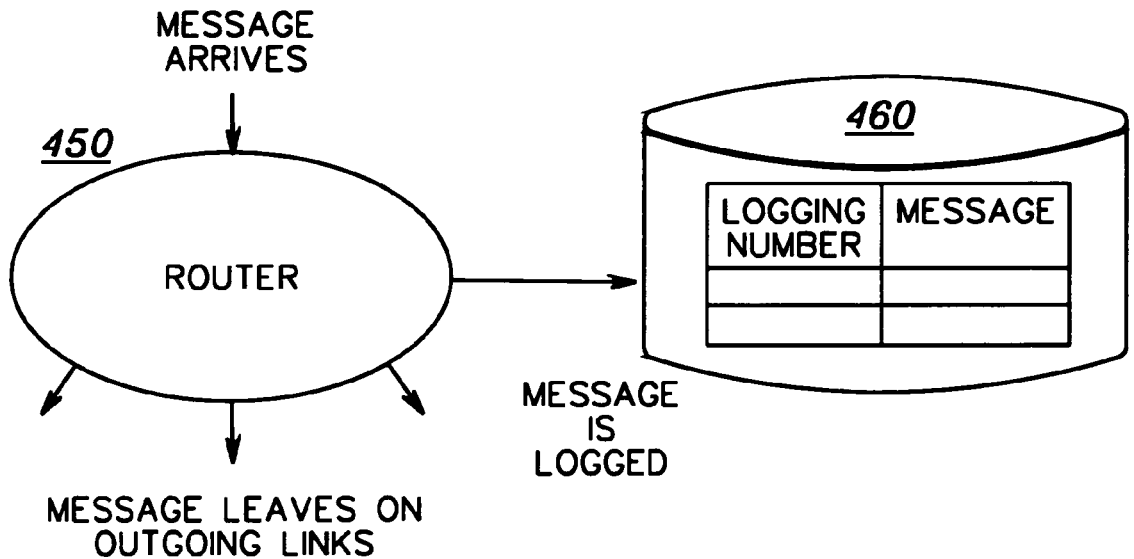
FIG. 5 depicts one example of a router configured as a logger with message logging capability in accordance with the principles of the present invention.
FIG. 6a depicts one example of a client message buffer used by a router having clients connected thereto in accordance with the principles of the present invention.
FIG. 6b depicts one example of a logging acknowledgment (LACK) message sent by a logger to a router in accordance with the principles of the present invention.

As noted, pursuant to this invention one or more selected routers in the network also serve as logging nodes. FIG. 5 depicts one embodiment of a logging node or logger which comprises a router 450 and persistent or stable storage 460, such as a file system or a database. When a published message is received at any logger node, the logger node performs the following logging functions in addition to the standard routing functions described above.

1. The message is assigned a next logging number in sequence.
2. The message is written to disk 460 using its logging number.
3. A logging acknowledgment (LACK) is sent to those routers to which the message was routed, as well as back towards the source node of the message. A LACK message (FIG. 6b) includes the message id, the logger id, and the logging number.

When a LACK message is received by a router, it looks up the routing information for the original message, sends the LACK message down the links the original message was sent excluding the link from which the LACK message was received. In addition, the router forwards the LACK towards the source of the original message, and deletes the routing information stored in the message table for that message. If the message table was lost due to the router failing and recovering, the LACK message is forwarded along all links on the spanning tree with the logger at the root, excluding the link from which the LACK message was received. Also, if the original message corresponding to the LACK was buffered waiting to be delivered to one or more subscribing clients requiring uniform delivery, the message will now be delivered.

In support of automatic recovery from failure, each router node also stores (pursuant to the present invention) the following information while processing LACK messages.

For each logger node from which a LACK has been received, the latest logging number that has been received for that logger.

For each link on which a LACK has been forwarded, the latest logging number that has been sent.

This information is stored into the LACK tables 408, 409 (FIG. 4) for the router. Since pursuant to this invention FIFO links are assumed between a logger and any given router, receiving (or sending) a LACK for a logging number N implies that all relevant LACKs for logging numbers less than N have also been received (or sent). Note that non-first-in first-out (non-FIFO) links are made FIFO for the present invention, for example, using standard techniques such as the TCP protocol.

As implied in the above description, three processing phases are implemented in one embodiment in accordance with the principles of the present invention. In a first phase, messages are routed from a publisher to all nodes in the network, but not necessarily delivered to all subscribers, depending upon whether uniform delivery has been specified by the publisher or the subscribers. In a second phase, messages are delivered from the routing nodes based upon an acknowledgment received from the logger node (i.e., the LACK message). This phase two processing and use of the loggers ensures uniform delivery of messages requiring reliable routing. A third phase is entered whenever a node or link fails within the network. This phase involves a request for and a replaying of messages that were lost due to the failure.

Figure 7:
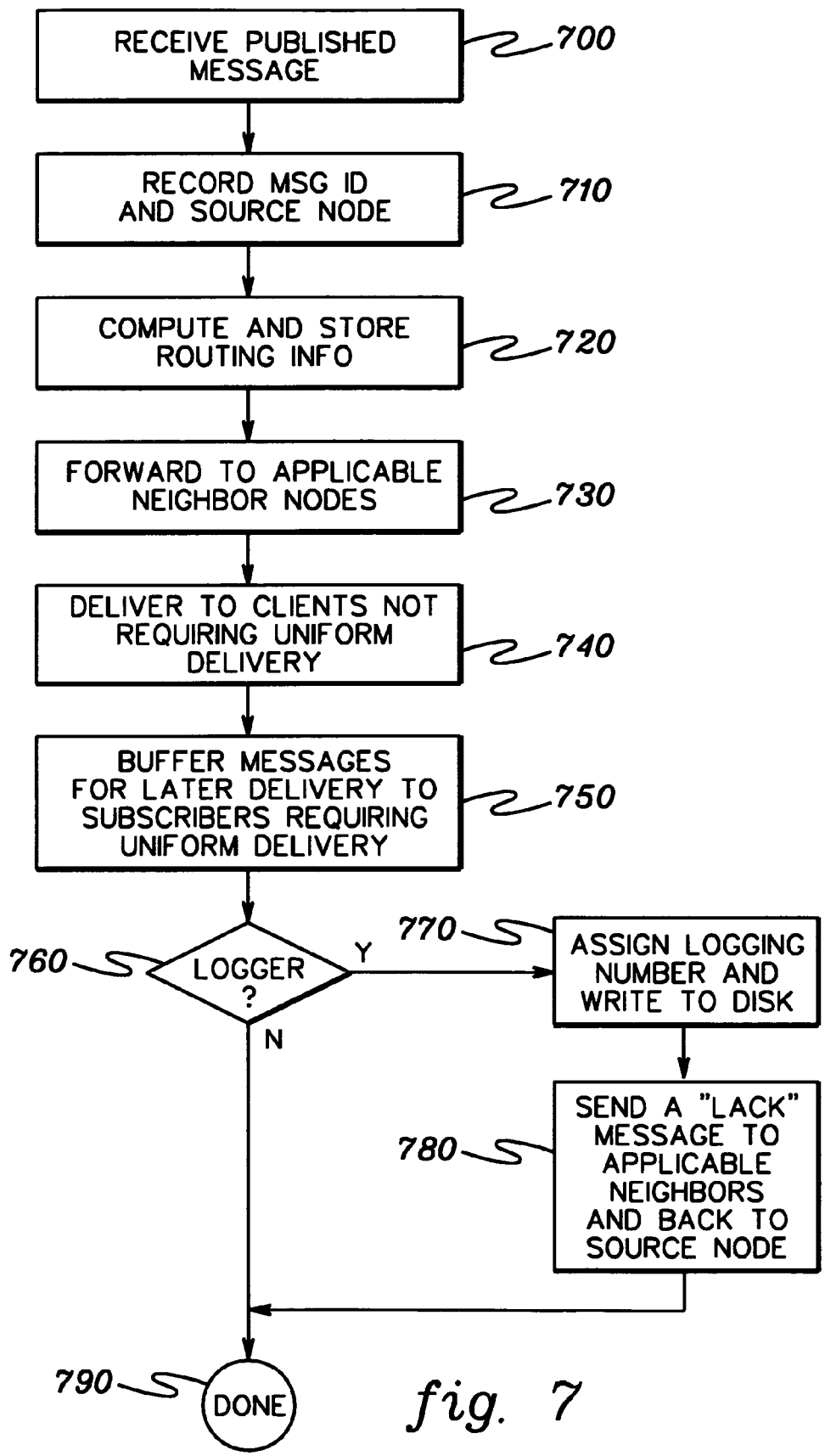
FIG. 7 is a flowchart of one embodiment of a resilient message routing process in accordance with the principles of the present invention.

FIG. 7 depicts one embodiment of phase one message routing processing in accordance with the present invention. This processing is implemented at each node of the network. At a given node, a published message is received 700 and recorded into the node's message table 402 (FIG. 4) using the message id and source node information provided with the message 710. The node's content routing computation 404 (FIG. 4) next determines neighboring node routing information which is also stored into the message table 720. Again, this computation is based on data content of the message when employing a routing system such as described in the initially-incorporated patent application.

The message is next forwarded to applicable neighboring nodes 730 as determined by the content routing computation, and delivered to subscribing clients not requiring uniform delivery 740. The subscribing clients comprise clients coupled to the particular router node processing the published message. For example, certain subscriber clients to a particular router node may require uniform delivery, while others may not. Thus, the process allows those clients not requiring uniform delivery to immediately receive the published message. Again, as used herein, "uniform delivery" comprises a system guarantee that subscribers who have requested uniform delivery receive the message only if all other subscribers requesting uniform delivery also receive the message. Otherwise, the message is not forwarded to any subscriber requesting the uniform delivery. Either every subscriber receives the published message or no subscriber of uniform delivery receives the published message.

In order to deliver messages to clients requesting uniform delivery, the router node proceeds to buffer the message for later delivery to those clients 750. If the router node is a logger 760, the message is assigned a logging number and written to disk 770. A logging acknowledgment (LACK) is then sent to the applicable neighboring router nodes (computed in step 720), as well as back to the source node providing the message now held in the message table 780. This completes 790 this embodiment of the message routing phase.

Figure 8:
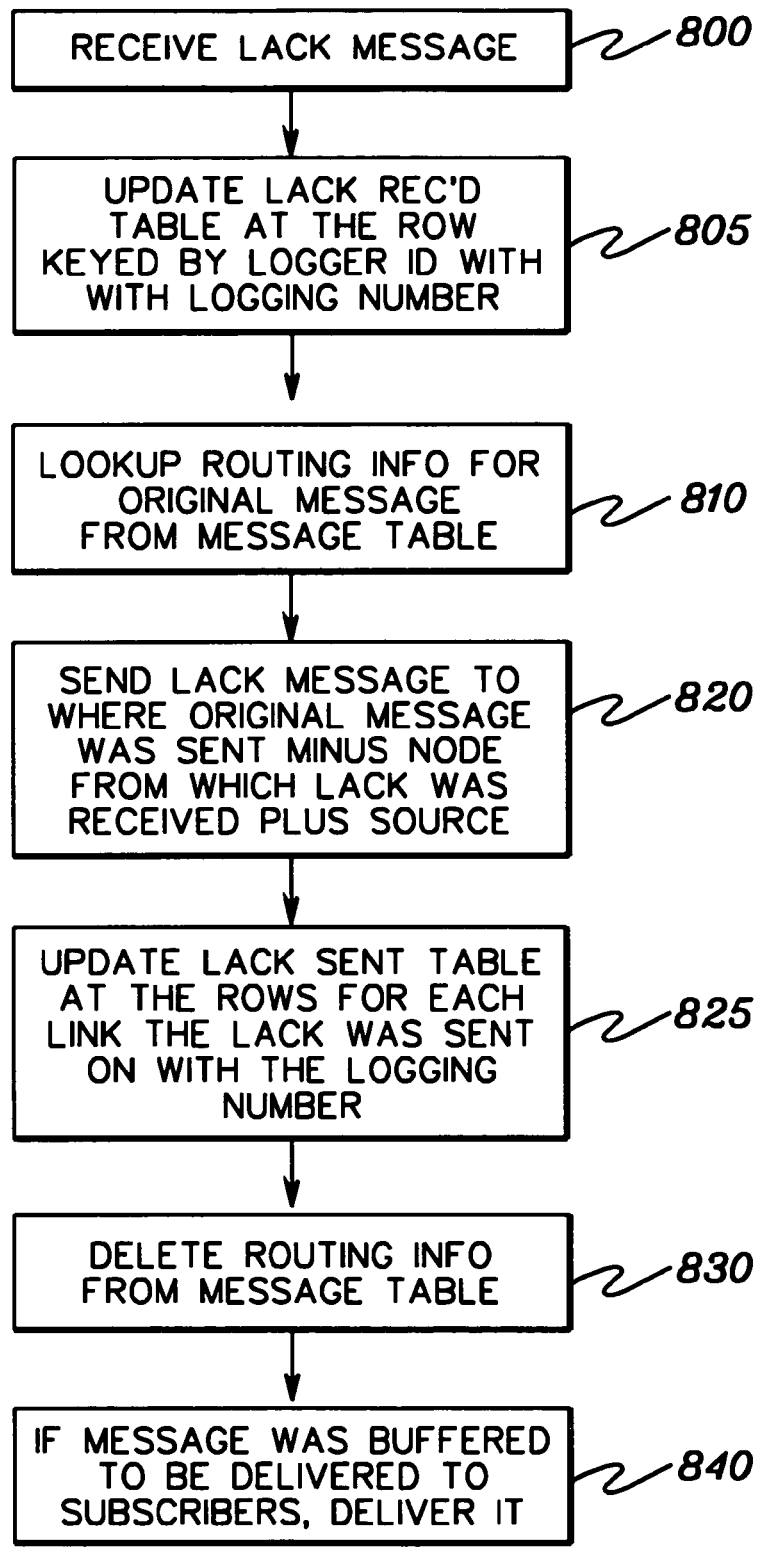
FIG. 8 is a flowchart of one embodiment of logging acknowledgment (LACK) processing in accordance with the principles of the present invention.

FIG. 8 depicts an approach for processing LACK messages in accordance with the principles of the present invention. Each router node in the network implements this processing upon receipt of a LACK message 800. First, the routing information for the original message is determined from the node's message table 810. The LACK message is then sent to those nodes where the original message was sent minus the neighboring node from which the LACK message was received and plus the original message's source node 820. The routing information corresponding to this message id is deleted from the node's message table 830, and, if the message was buffered in the client message buffer table (such as depicted in FIG. 6a) for delivery to one or more clients, then the message is now delivered.

Essentially, the process comprises determining whether there is a message id in the uniform delivery table corresponding to the id of the LACK message being processed. If so, then the message is retrieved from the uniform delivery table and delivered to the one or more clients of the node requesting uniform delivery. Thus, uniform delivery means that the message is buffered in the client message buffer of the node and then delivered once the logging acknowledgment signal is received back from a logging node of the network.

In a third phase, a routing system in accordance with the principles of the present invention enters a failure recovery process whenever a router detects failure of, for example, its parent node, or the link to its parent node. The detecting child router notifies a configuration manager, which we assume tracks the configuration of the router network. The configuration manager replies with a replacement parent node. This new parent has the same parent and children as the failed node. Implementation of this monitoring for node failure and replacement of a parent node are within the capabilities of one of ordinary skill in the art.

Note that a configuration manager is a "network system service" that is responsible for maintaining information about the structure, function, and status of a network system. This includes information such as the network topology, nodes with certain properties (such as loggers), quality of service offered nodes in the network, etc. A system's configuration may be statically fixed or dynamically changing. A configuration manager may be centralized or distributed. Network system management products such as IBM's Tivoli TME-10 contain configuration management components. From the perspective of the current invention, the system uses the topology information in the configuration manager when nodes or links fail and substitutes nodes to re-establish these failed components.

Figure 9:
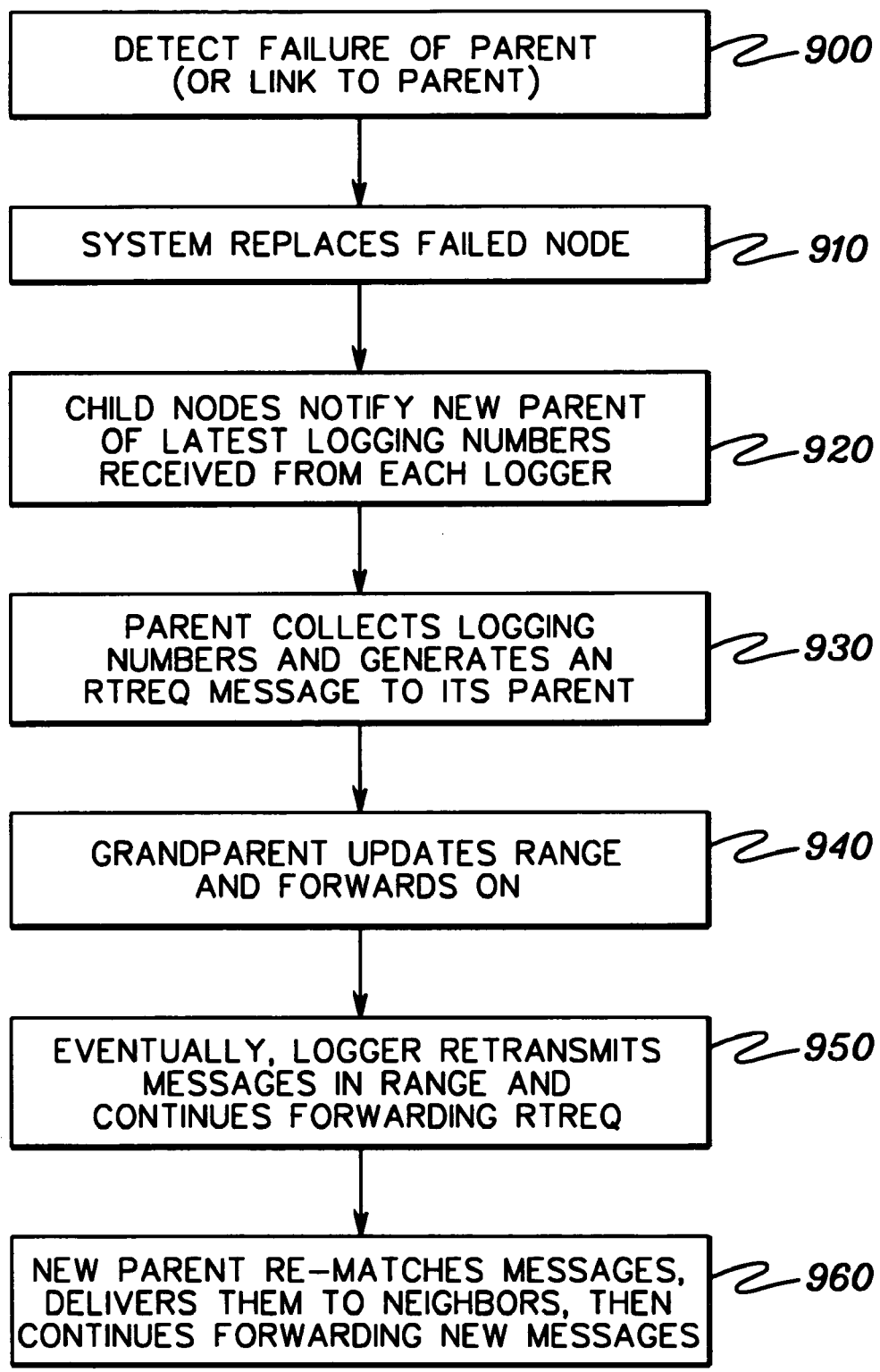
FIG. 9 is a flowchart of one example of processing for failure recovery within the routing network in accordance with the principles of the present invention.

Referring to FIG. 9, in one embodiment, the failure recovery phase of the present invention begins with detection of failure of the parent node, or a link to the parent node 900. The configuration manager or system replaces the failed node 910, and child nodes of the failed node notify the new parent of the latest logging numbers received from each logger of the system 920. The new parent collects these responses into a sequence and forwards a request for retransmission (RTREQ) for this range of messages to its parent node 930. Upon receiving an RTREQ message, each router narrows the set of requested messages based on its logging sequence vector for the child link from which the RTREQ was received, after which the RTREQ message is forwarded on to the next node 940.

Upon receiving an RTREQ message at a logger node, the logger node narrows the set of requested messages and forwards the message onto the rest of the tree, while also finding all messages in the narrowed set of messages that it has logged and retransmits them to the new parent 950. When the new parent receives re-transmitted messages it requested from a logging router, it matches the messages that fall in the persistence range and delivers them to the appropriate children nodes 960. After all such messages have been delivered, the new parent node begins to forward new messages to its children, thereby preserving the FIFO property of the protocol.

Optionally, each router node may cache a set of recently sent messages. When used, the cache may reduce the number of messages requested in an RTREQ message or may eliminate the need for an RTREQ message.

Figure 10:
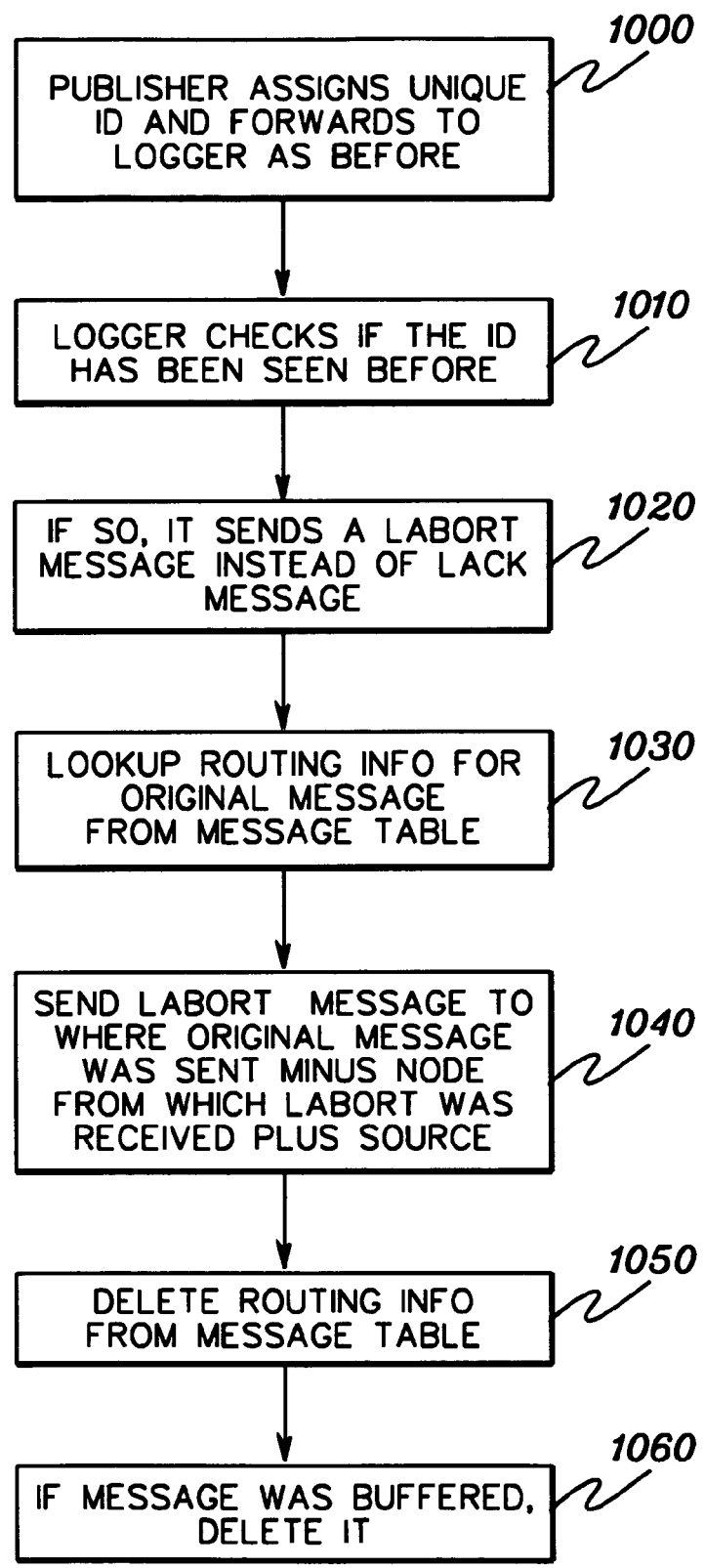
FIG. 10 is a flowchart of an at most once delivery quality of service in accordance with the principles of the present invention.

To summarize, using the above protocol a message is guaranteed to be received by all subscribers requiring the "uniform delivery" quality of service, or none at all will receive the message. However, if a publisher crashes and recovers and as a result republishes a message, the message may be delivered multiple times to subscribers. The present invention avoids this problem using the following augmentation to the uniform delivery protocol. The augmentation is referred to as "at most once delivery" of messages, and one embodiment of the process is depicted in FIG. 10.

Clients desiring duplicate detection include a client-specific unique identifier with each message before forwarding the message up towards the logger node as in the original protocol 1000. Upon receipt of a data message, the logging engine checks to see if the node has previously seen the client-specific unique identifier 1010. If it has, the node logs the fact that it will abort this message, and transmits a logging abort (LABORT) message through the tree instead of a LACK message 1020. Each LABORT message still has a logging sequence number so that, in case of failures, routing nodes will receive possibly lost LABORT messages and, therefore, eventually remove routing information saved for the duplicate message. Upon receipt of a LABORT message at a node, the routing information for the original message is determined from the node's message table 1030. The LABORT message is then sent to those nodes where the original message was sent minus the neighboring node from which the LABORT message was received plus the original message's source node 1040. The routing information corresponding to this message id is deleted from the node's message table 1050, and, if the message was buffered in the client message buffer table for delivery to one or more clients, then the message is deleted 1060.

Figure 11:
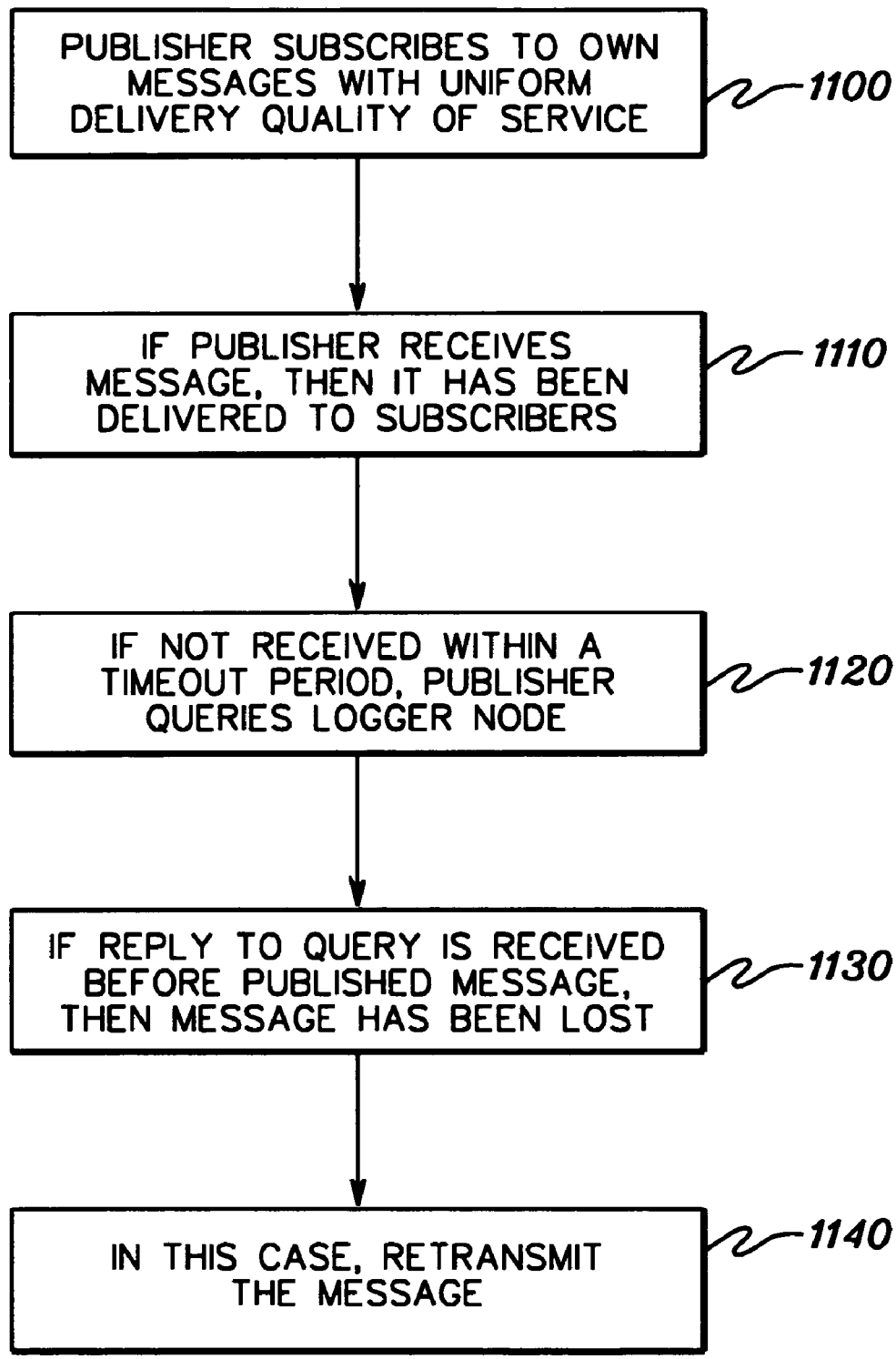
FIG. 11 is a flowchart of an at least once delivery quality of service in accordance with the principles of the present invention.

Using the above protocol, a message is guaranteed to be received by all subscribers requiring the "uniform delivery" quality of service if the message reaches a logger node. It may also happen that a message is lost before it reaches a logger, due to failure of a router or link in route to a logger. In this case, the message is not at all delivered to uniform delivery subscribers. It is also desirable for publishers to become aware of the fact that a message has not reached a logger node, and if so, republish the message, thereby guaranteeing the delivery of the message "at least once" to every subscriber. The present invention handles this as depicted in FIG. 11.

Basically, a publisher can detect whether a message has been delivered to "uniform delivery" subscribers by subscribing to its own messages under the "uniform delivery" quality of service 1100. If the publisher receives the message, then it has been delivered to the uniform subscribers 1110. However, if the publisher does not receive the message within a certain time out period, it can query a logger node whether the published message has been logged 1120. If the reply to this query is received by the publisher before the original published message, it can be inferred, due to the FIFO property of links, that the original published message has been lost before it reached the logger node 1130. In this case, the message can be republished 1140.

As a further variation, "exactly once" delivery of messages can be ensured by using in combination the protocols for at most once delivery and at least once delivery of messages. A message is delivered exactly once to each subscriber in the face of: (1) publisher failures and recoveries; (2) node and link failures before a message gets to a logger; and (3) node and link failures after a message gets to a logger and before delivery to subscribers. These are respectively accomplished as follows: (1) a publisher includes a unique id in a message with the help of which the system detects duplicate publications of a message and removes the duplicate, as described above; (2) the publisher makes sure that a message reaches a logger by subscribing to its own messages as well as by querying the logger for lost messages, as described above; and (3) detecting node and link failures, re-establishing these nodes and links, and replaying lost messages from one or more loggers, as described above.

To summarize, those skilled in the art will note from the above description that in a publish/subscribe system supporting content-based subscription, a method to route messages based on content has been provided in a manner that is resilient to router or link failure. The publish/subscribe system may be realized as a router network connected in an arbitrary graph topology, except that the links from a logger node to any router are assumed to be FIFO. Further, a method to deliver a message to either all subscribers requesting a "uniform delivery" quality of service, or to none of them, is described above. Variations on this "uniform delivery" quality of service outlined above include an "at most once" quality of service, an "at least once" quality of service, and an "exactly once" quality of service.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for routing messages within a network, said method comprising:

receiving a message;

routing said message to multiple clients of said network, said routing being based on data content of said message irrespective of any destination information within said message and being resilient to router or link failure within said network without loss of said message; and wherein said network comprises a publish/subscribe system supporting content-based subscription, said one or more clients comprise subscribers, and wherein said routing comprises delivering said message to all subscribers requesting a uniform delivery quality of service or if unable to deliver said message to all of said subscribers requesting uniform delivery, delivering said message to none of said subscribers requesting uniform delivery.

2. The method of claim 1, wherein said delivering said message to all subscribers requesting uniform delivery comprises delivering said message to all subscribers requesting uniform delivery notwithstanding failure at one or more routers or links of said network, said delivering comprising storing said message to persistent storage at a logging node of said network prior to providing said message to said subscribers requesting uniform delivery.

3. The method of claim 1, wherein said routing comprises logging said message at at least one logging node within said network before delivering said message to said multiple clients of said network, said logging comprising storing said message in persistent storage.

4. The method of claim 3, further comprising subsequent to said logging of said message, sending a logging acknowledgment to at least one router of said network routing said message, and upon receipt of said logging acknowledgment at said at least one router, delivering said message to a client thereof, said client requiring uniform delivery and comprising one client of said multiple clients.

5. The method of claim 4, further comprising buffering said message at said at least one router of said network routing said message, said buffering occurring prior to said storing of said message at said persistent storage and when passing said message through said at least one router to said at least one logging node.

6. The method of claim 4, wherein said network comprises a plurality of routers coupled together, one of said routers comprising said logging node having said persistent storage associated therewith, said logging comprising employing said logging node having said persistent storage associated therewith to store said message and to thereafter send said logging acknowledgment back to each router of said network responsible for routing said message.

7. A method for routing messages within a network, said method comprising:

receiving a message;

routing said message to multiple clients of said network said routing being based on data content of said message irrespective of any destination information within said message, and being resilient to router or link failure within said network without loss of said message; and wherein said network comprises a spanning tree and wherein said method further comprises providing a logging node within said spanning tree for logging said message to persistent storage during routing of said message to said one or more clients of said network.

8. The method of claim 7, wherein said routing comprises employing said logging of said message to persistent storage to ensure a uniform delivery quality of service of said message to said one or more clients of said network notwithstanding failure of one or more routers or links within said network.

9. The method of claim 7, wherein said spanning tree hag comprises a plurality of routers, said method further comprising detecting failure of a router within said tree before completing routing of said message to said multiple clients of said network, reconfiguring said tree to replace said failed router with a new router, and automatically generating a request for retransmission of said message.

10. The method of claim 9, further comprising prior to said detecting of said failure, logging said message within persistent storage of said network and issuing a logging acknowledgment confirming storage of said message to at least one router of said tree through which said message is routed to said multiple clients.

11. The method of claim 9, wherein said automatically generating said request for retransmission of said message occurs if said new router detects from one or more of its child routers a logging number associated with said message, said logging number having been received in said logging acknowledgment confirming storage of said message.

12. The method of claim 7, wherein said routing further comprises determining within said network whether said message comprises a duplicate message to said multiple clients of said network, and if so, aborting said duplicate message such that said message is delivered to said multiple clients at most once.

13. The method of claim 7, further comprising automatically informing a sender of said message when the message has not been received by the network to allow the sender to retransmit said message to the network for routing to said multiple clients of said network so that said message is delivered at least once to said multiple clients.

14. A method for routine messages within a network, said method comprising:

receiving a message;

routing said message to multiple clients of said network, said routine being based on data content of said message irrespective of any destination information within said message, and being resilient to router or link failure within said network without loss of said message; and wherein said routing comprises logging said message at at least one logging node within said network before delivering said message to said multiple clients of said network, said logging comprising storing said message into persistent storage, and wherein said method further comprises subsequent to said logging of said message, sending a logging acknowledgment to at least one router of said network routing said message, and upon receipt of said logging acknowledgment at said at least one router of said network routing said message, looking up routing information for said message from a message table maintained at said at least one router, then sending said logging acknowledgment across said network using said looked up routing information, and thereafter deleting said routing information from said message table.

15. A system of routing messages within a network, said system comprising:

means for receiving a message;

means for routing said message to multiple clients of said network, said routing being based on data content of said message irrespective of any destination information within said message, and wherein said means for routing is resilient to router or link failure within said network without loss of said message;

wherein said network comprises a publish/subscribe system supporting content-based subscription, and wherein said one or more clients comprise subscribers, with said message being received from a publisher; and wherein said means for routing comprises means for delivering said message to all subscribers requesting a uniform delivery quality of service or if unable to deliver said message to all of said subscribers requesting uniform delivery, for delivering said message to none of said subscribers requesting uniform delivery.

16. The system of claim 15, wherein said means for routing delivers said message to said subscribers requesting uniform deliver notwithstanding failure at one or more routers or links of said network, and wherein said system further comprises means for logging said message to persistent storage prior to delivery thereof to said subscribers requesting uniform delivery.

17. A system of routing messages within a network, said system comprising:

means for receiving a message;

means for routing said message to multiple clients of said network, said routing being based on data content of said message irrespective of any destination information within said message, and wherein said means for routing is resilient to router or link failure within said network without loss of said message, and wherein said means for routing comprises means for logging said message to at least one logging node within said network before delivering said message to said multiple clients of said network, said means for logging comprising means for storing said message in persistent storage.

18. The system of claim 17, further comprising means for sending a logging acknowledgment to at least one router of said network routing said message after said means for logging stores said message in persistent storage, and wherein said system further comprises, at said at least one router of said network routing said message, means for delivering said message to a client thereof upon receipt of said logging acknowledgment, said client requiring uniform delivery and comprising one client of said multiple clients.

19. The system of claim 18, further comprising means for buffering said message at said at least one router of said network routing said message, said buffering occurring prior to said storing of said message at said persistent storage by said means for logging.

20. The system of claim 18, wherein said network comprises a plurality of routers coupled together, one of said routers comprising said logging node having said persistent storage associated therewith, and wherein said means for logging comprises means for employing said logging node having said persistent storage associated therewith to store said message and to thereafter send said logging acknowledgment back to each router of said network responsible for routing said message.

21. The system of claim 17, wherein said network comprises a spanning tree and wherein said system further comprises a logger node within said spanning tree for logging said message to persistent storage during routing of said message to said multiple clients of said network.

22. The system of claim 17, wherein said means for routing comprises means for employing said logger node to log said message to persistent storage to ensure a uniform delivery quality of service of said message to said multiple clients of said network notwithstanding failure of one or more routers or links within said network.

23. The system of claim 17, wherein said network comprises a spanning tree having a plurality of routers, and further comprising means for detecting failure of a router within said tree before completing routing of said message to said multiple clients of said network, and means for reconfiguring said tree to replace said failed router with a new router, and means for automatically generating a request for retransmission of said message.

24. The system of claim 23, further comprising means for logging said message within persistent storage of said network and for issuing a logging acknowledgment confirming storage of said message to at least one router of said tree through which said message is routed to said multiple clients.

25. The system of claim 24, wherein said means for automatically generating a request for retransmission of said message comprises means for detecting a logging number associated with said message stored at one or more child routers of said new router.

26. The system of claim 17, wherein said means for routing further comprises means for determining within said network whether said message comprises a duplicate message to said multiple clients of said network, and if so, for aborting said duplicate message such that said message is delivered to said multiple clients at most once.

27. The system of claim 17, further comprising means for automatically informing a sender of said message when said message has not been received by the network to allow the sender to retransmit said message to the network for routing to said multiple clients of said network so that said message is delivered at least once to said multiple clients.

* * * * *

UNITED STATES PATENT AND TRADEMARK OFFICE
CERTIFICATE OF CORRECTION

| | | |
|---|---|---|
| PATENT NO. | : 7,050,432 B1 | Page 1 of 1 |
| APPLICATION NO. | : 09/281421 | |
| DATED | : May 23, 2006 | |
| INVENTOR(S) | : Banavar et al. | |

It is certified that error appears in the above-identified patent and that said Letters Patent is hereby corrected as shown below:

Claims

Col. 13, line 16, delete the word "hag" after the word "tree"

Signed and Sealed this

Twenty-second Day of August, 2006

JON W. DUDAS
*Director of the United States Patent and Trademark Office*